(12) United States Patent
Frerking et al.

(10) Patent No.: US 7,719,228 B2
(45) Date of Patent: *May 18, 2010

(54) PORTABLE BATTERY RECHARGE STATION FOR SECONDARY BATTERIES

(75) Inventors: Melvin D. Frerking, Norcross, GA (US); John Keith Parker, Cumming, GA (US); Alonzo L. Watts, Roswell, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/147,147

(22) Filed: Jun. 26, 2008

(65) Prior Publication Data

US 2008/0258680 A1 Oct. 23, 2008

Related U.S. Application Data

(63) Continuation of application No. 10/615,300, filed on Jul. 9, 2003, now Pat. No. 7,405,535, which is a continuation of application No. 10/195,560, filed on Jul. 16, 2002, now Pat. No. 6,624,616, which is a continuation of application No. 09/822,510, filed on Apr. 2, 2001, now Pat. No. 6,441,589.

(51) Int. Cl.
*H01M 10/46* (2006.01)
(52) U.S. Cl. .................................................. 320/111
(58) Field of Classification Search ................. 320/103, 320/106, 125, 137, 162, 110, 111
See application file for complete search history.

(56) References Cited

U.S. PATENT DOCUMENTS 6,441,589 B1 * 8/2002 Frerking et al. ............. 320/162

OTHER PUBLICATIONS

CallPod—ChargePod. http://www.callpod.com/products/chargepod. no date.*

* cited by examiner

*Primary Examiner*—Edward Tso
(74) *Attorney, Agent, or Firm*—Scott P. Zimmerman PLLC

(57) ABSTRACT

A system and method for recharging secondary batteries. One embodiment of the present invention comprises a supervisory circuit, a voltage converter, a portable power source, and one or more of a holder and a socket. The holder is adapted to receive a specific type of secondary battery of a portable device. The socket is adapted to mate with a plug of a device-specific charging cord connected to the portable device. Each of the holder and the plug can be associated with a programming resistor that provides a voltage requirement of the secondary battery. When the secondary battery is either placed in the holder or is connected to the socket, the supervisory circuit communicates with the voltage converter to supply the appropriate voltage required to recharge the secondary battery. The voltage converter receives power from the portable power source. The voltage converter can convert the voltage of the portable power source up (i.e., increasing the voltage) or down (i.e., decreasing the voltage) as appropriate to recharge the secondary battery as instructed by the supervisory circuit. The portable power source of the portable battery recharge station can be one of several types of power sources. For example, the portable power source can be replaceable, rechargeable, or renewable.

14 Claims, 4 Drawing Sheets

PORTABLE BATTERY RECHARGE STATION FOR SECONDARY BATTERIES

The present application is a continuation of U.S. patent application Ser. No. 10/615,300, entitled PORTABLE BATTERY RECHARGE STATION, filed on Jul. 9, 2003 now U.S. Pat. No. 7,405,535, and is herein incorporated by reference in its entirety. U.S. patent application Ser. No. 10/615,300, in turn, is a continuation of U.S. patent application Ser. No. 10/195,560, filed on Jul. 16, 2002 (now issued as U.S. Pat. No. 6,624,616), which is a continuation of U.S. patent application Ser. No. 09/822,510, filed Apr. 2, 2001 (now issued as U.S. Pat. No. 6,441,589). The present application claims priority from U.S. patent application Ser. No. 09/822,510 under 35 USC §120.

BACKGROUND

1. Field of the Invention

The present invention relates generally to battery chargers. More particularly, the present invention relates to a portable battery recharge station that can utilize a number of different portable power sources for recharging different types of secondary batteries of a variety of portable devices.

2. Background of the Invention

Many electrical appliances and electronic devices are portable. Specific examples of portable devices include wireless telephones, laptop computers, camcorders, pocket PCs, and toys. Some of these portable devices use primary batteries, e.g., alkaline batteries. Most of them, however, are powered by different types of rechargeable or secondary batteries. Examples of the types of secondary batteries include nickel-cadmium (NiCd), nickel-hydrogen (NiH$_2$), nickel-metal hydride (NiMH), lithium ion (Li-ion), lithium polymer (Li-polymer), and lead acid batteries. Although zinc-air batteries have been widely used as primary batteries, they are also gaining popularity for use as secondary batteries.

Portable devices become disabled or inoperable when the power of their batteries drop below certain threshold. At that time, users of the portable devices must either replace depleted primary batteries with new primary batteries, or find a power source to recharge secondary batteries.

As known in the art, each portable device that uses a secondary battery is equipped with a unique charger dedicated to recharge the secondary battery. In other words, a typical consumer having three different types of portable devices may have three different battery chargers. For example, the consumer may have a first battery charger for his wireless telephone, a second battery charger for his camcorder, and a third battery charger for his Pocket PC. These three battery chargers are not interchangeable. In other words, the first battery charger may not be used for the camcorder or the Pocket PC. As a result, users of these battery chargers must carry all three chargers along with their portable devices. Accordingly, there is a need for a universal battery charger for multiple portable devices.

A typical secondary battery can be recharged using one of two power sources. For example, the typical secondary battery can be recharged by one battery charger adapted to receive energy from an electrical wall outlet. In addition, the typical secondary battery can be recharged by another battery charger adapted to receive electrical energy from a cigarette lighter outlet of an automobile. There are many situations in which neither of the power sources is available. For example, an explorer who is out in the field for days or weeks at a time may endanger himself when his wireless communication device becomes inoperable due to a depleted battery. Similarly, a news crew member can lose valuable opportunities when its camcorder runs out of battery during an important news coverage at a place where no power source is available. Accordingly, there is a need for a portable battery recharge station that can recharge secondary batteries with a portable power source.

There are a number of battery chargers known in the art. For example, U.S. Pat. No. 5,343,136 (the "Yamaguchi patent") discloses a charger having a chargeable battery with a larger current capacity than a target chargeable battery of a cordless telephone. The charger disclosed can only be used to recharge its associated target chargeable battery.

U.S. Pat. No. 5,396,162 (the "Brilmyer patent") discloses a portable battery charger that utilizes an assembly of primary battery cells to recharge the rechargeable battery of a battery appliance. The portable battery charger disclosed is limited to using primary battery cells as its portable power source.

U.S. Pat. No. 5,565,756 (the "Urbish patent") discloses a microprocessor controlled portable battery charger for use with a variety of battery packs. The charger disclosed can use either primary or secondary batteries as its portable power source. The charger requires charging, sensing, identifying, and output means to properly recharge the battery packs.

U.S. Pat. No. 6,154,007 (the "Shaver patent") discloses a battery charging system that enables rapid recharging of a working battery without the need for current limit and/or over-voltage protection. The portable battery charging system disclosed, however, must always have a greater number of cells than the number of cells in the working battery.

Various technologies related to rechargeable batteries are further disclosed in other U.S. patents. For example, U.S. Pat. Nos. 5,747,968 and 5,773,959 (the "Merritt patents") disclose lithium polymer battery charging methods and apparatus. U.S. Pat. No. 5,645,960 (the "Scrosati patent") discloses a thin film lithium polymer battery. U.S. Pat. Nos. 6,091,230 and 6,166,548 (the "Winzer patents") discloses a voltage recovery method for a zinc-air battery and a method of detecting battery capacity of a zinc-air battery, respectively. U.S. Pat. No. 6,146,781 (the "Surampudi patent") discloses a direct methanol feed fuel cell and system. U.S. Pat. No. 5,352,967 (the "Karl-Diether patent") discloses a charging method for NiCd and NiH cells. U.S. Pat. No. 6,043,631 (the "Tsenter patent") discloses a method for charging NiCd, NiH$_2$ and NiMH batteries.

Each of the above-referenced U.S. patents is incorporated herein by reference in its entirety.

SUMMARY OF THE INVENTION

The present invention is a system and method for recharging secondary batteries. One embodiment of the present invention is a portable battery recharge station. The recharge station comprises a supervisory circuit, a voltage converter, a portable power source, and at least one holder that is adapted to receive a specific type of secondary battery of a portable device.

In this embodiment, when a secondary battery is placed in the holder, the supervisory circuit that is connected to the holder communicates with the voltage converter to supply an appropriate voltage required to recharge the secondary battery. The voltage converter receives electrical power from the portable power source. The voltage converter can convert the voltage of the portable power source up (i.e., increasing the voltage) or down (i.e., decreasing the voltage) as appropriate to recharge the secondary battery as instructed by the supervisory circuit.

The portable power source of the portable battery recharge station can be one of several types of power sources. For example, the portable power source can be replaceable, rechargeable, or renewable. Replaceable power source can comprise a primary battery. Examples of primary batteries are alkaline and zinc-air batteries. When a primary battery is depleted, it is removed from the portable battery recharge station and replaced by a fresh or new primary battery.

A rechargeable power source can comprise a secondary battery. Examples of secondary batteries include NiCd, $NiH_2$, NiMH, Li-ion, Li-polymer, and zinc-air batteries. A depleted secondary battery can be recharged by an external power source through a recharger of the portable battery recharge station.

A renewable power source can comprise a renewable battery. Examples of renewable batteries include a methanol fuel cell and other fuel cell whose electrolyte can be replenished or otherwise replaced. When a renewable battery is depleted, an appropriate fuel can be added or old electrolyte can be renewed to supply energy to the portable power source. For example, zinc electrolyte cells can be renewed by replacing the electrolyte in the cell.

Preferably, the portable battery recharge station has more than one holder. Each holder can be adapted to receive a specific type of secondary battery. For example, a first holder can be adapted to receive a Ni—Cd battery, a second holder can be adapted to receive a NiMH battery, a third holder can be adapted to receive a Li-ion battery, a fourth holder can be adapted to receive a Li-polymer battery, and so on. The holders must be designed to accommodate the physical dimensions of the battery, as well as the placement of the contacts on the battery. Optionally, some of the battery holders may be modified with exchangeable plates designed to accommodate different battery dimensions and contact placements. The supervisory circuit connected to the holders can detect which holder or holders have received a secondary battery. The supervisory circuit can then inform the voltage converter to supply an appropriate voltage to each of the holders that has received a secondary battery. Of course, different batteries (e.g., a NiCd and a Li-ion battery) having the same dimensions could be used with the same holder, because the supervisory circuit can detect the appropriate voltage required for the battery.

In another embodiment, the present invention is a battery charging system comprising a portable battery recharge station and a device-specific charging cord. The portable battery recharge station of this embodiment has a universal connector socket in addition to or in lieu of the holder described above. The universal connector socket is adapted to mate with a universal connector plug that is on one end of the device-specific charging cord. The universal connector plug comprises a programming resistor that identifies the type of secondary battery that is used by a portable device associated with the device-specific charging cord. The other end of the device-specific charging cord has a device-specific charge connector that is adapted to mate with a normal device charger connector of the portable device. Preferably, the portable battery recharge station has more than one universal connector socket so that multiple secondary batteries of a plurality of portable devices can be recharged concurrently.

Accordingly, it is an object of the present invention to provide a portable battery recharge station that can recharge different types of secondary batteries of various portable devices.

It is another object of the present invention to provide a portable battery recharge station that can use a variety of portable power sources.

It is another object of the present invention to provide a portable battery recharge station than can recharge two or more types of secondary batteries concurrently.

These and other objects of the present invention are described in greater detail in the detailed description of the invention, the appended drawings, and the attached claims.

DETAILED DESCRIPTION OF THE INVENTION

Figure 1:
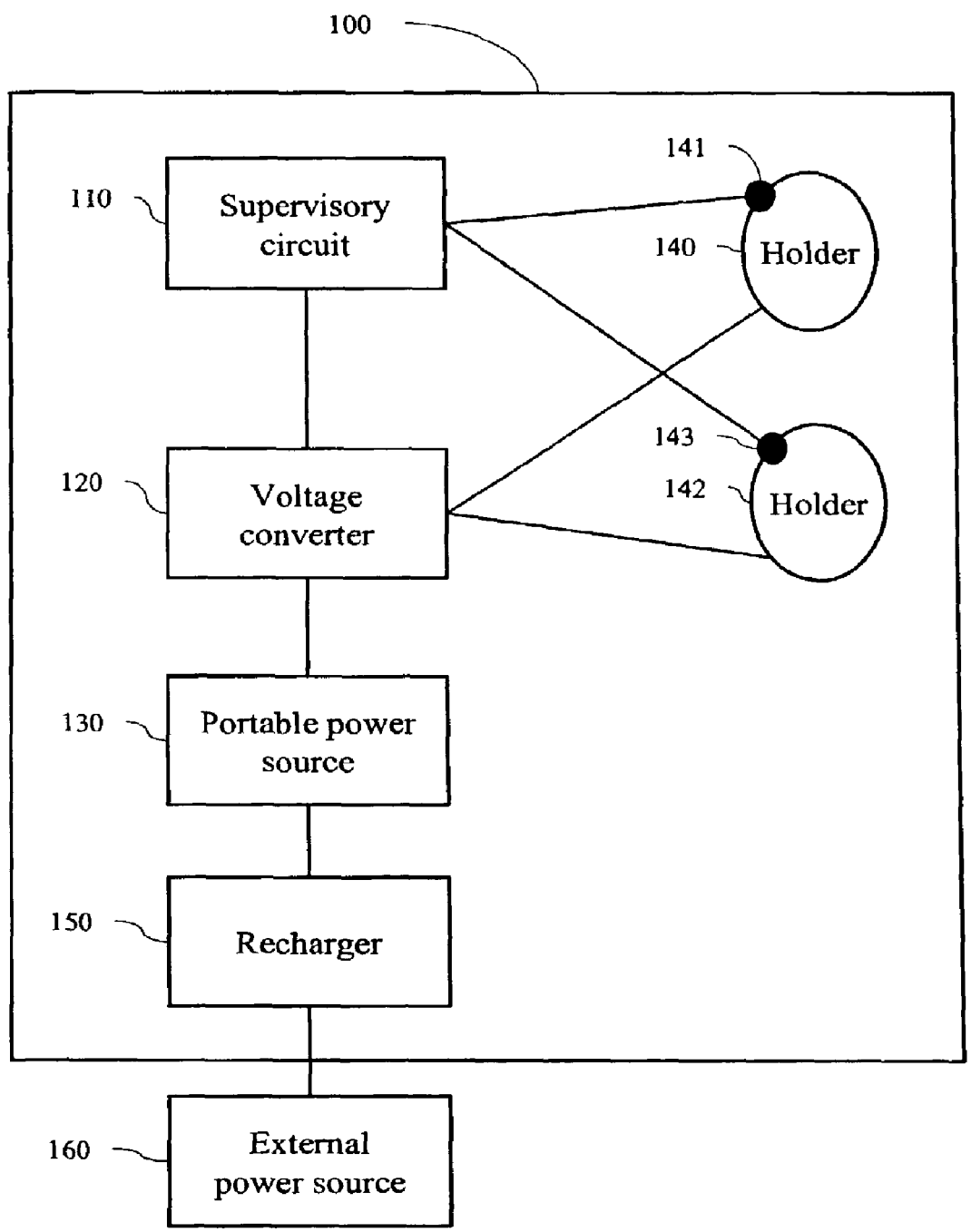
FIG. 1 is a schematic diagram illustrating an embodiment of the present invention comprising a portable battery recharge station having a plurality of holders.

FIG. 1 is a schematic diagram illustrating an embodiment of the present invention comprising a portable battery recharge station having a plurality of holders.

Portable battery recharge station 100 comprises supervisory circuit 110, voltage converter 120, portable power source 130, holders 140 and 142, and optionally recharger 150. Although for the purposes of illustration, FIG. 1 shows two holders 140 and 142, portable battery recharge station 100 could comprise only one holder, and preferably comprises two, three, four or more holders.

Each of holders 140 and 142 can be adapted to receive a specific type of secondary battery of a portable device. In other words, holder 140 can be adapted to receive a first type of secondary battery and holder 142 can be adapted to receive a second type of secondary battery. Types of secondary batteries that may be placed in holders 140 and 142 include NiCd, $NiH_2$, NiMH, Li-ion, Li-polymer, zinc-air, and lead acid batteries. Preferably, each of holders 140 and 142 is adapted to receive only one type of secondary battery. Preferably, holders 140 and 142 are equipped with programming resistors 141 and 143, respectively. Each of programming resistors 141 and 143 is selected according to one type of secondary battery and an associated voltage requirement of the secondary battery.

Supervisory circuit 110 is connected to programming resistors 141 and 143. When a secondary battery is placed in holder 140, supervisory circuit 110 determines the voltage requirement of the secondary battery from the value of the resistance of programming resistor 141 using, for example, a look-up table (that associates voltage requirements with different values of resistances of the programming resistor) or an equation or formula (that calculates the voltage requirement based upon the value of the resistance of the programming resistor). Similarly, when a different secondary battery is placed in holder 142, supervisory circuit 110 knows the voltage requirement of the different secondary battery through programming resistor 143.

Supervisory circuit 110 is connected to voltage converter 120. Supervisory circuit 110 reports the voltage requirements of the secondary batteries in holders 140 and 142 to voltage converter 120. For example, when a 4.5-volt secondary battery of a wireless telephone is placed in holder 140, supervisory circuit 110 instructs voltage converter 120 to supply the appropriate voltage (for example, 6 volts) to holder 140. Similarly, when a 12-volt secondary battery of a laptop computer is received by holder 142, supervisory circuit 110 instructs voltage converter 120 to supply the appropriate voltage (for example, 14 volts) to holder 142. Preferably, voltage converter 120 can concurrently supply different voltages to holders 140 and 142. In other words, station 110 is adapted to recharge two (or more) different types secondary batteries concurrently.

Voltage converter 120 is connected to supervisory circuit 110 and holders 140 and 142. In addition, voltage converter 120 is connected to portable power source 130. Voltage converter 120 can convert energy received from portable power source 130 up or down. For example, if portable power source 130 comprises a 12-volt battery and the appropriate voltage for recharging secondary battery in holder 140 is 6 volts (e.g., to charge a 4.5 volt battery), voltage converter 120 can convert the 12 volts received from portable power source 130 down to 6 volts for the secondary battery in holder 140. Similarly, if portable power source 130 comprises a 6-volt battery and the appropriate voltage for recharging secondary battery in holder 142 is 14 volts (e.g., to charge a 12 volt secondary battery), voltage converter 120 can convert the 6 volts received from portable power source 130 up to the 14 volts necessary to charge the secondary battery in holder 142.

Portable power source 130 can be replaceable, rechargeable, or renewable. Replaceable batteries can include alkaline and zinc-air batteries. Rechargeable batteries can include NiCd, $NiH_2$, NiMH, Li-ion, Li-polymer, zinc-air, and lead acid batteries. Renewable batteries can include methanol fuel cells and renewable electrolyte type cells. When portable power source 130 is depleted, it can be replaced, recharged, or renewed accordingly.

Recharger 150 is an optional component that is adapted to receive electrical energy from external power source 160 to recharge portable power source 130 that comprises a rechargeable battery. External power source 160 can be one of several external power sources. For example, external power source 160 can be a wall electrical outlet or the cigarette lighter outlet of an automobile.

Figure 2:
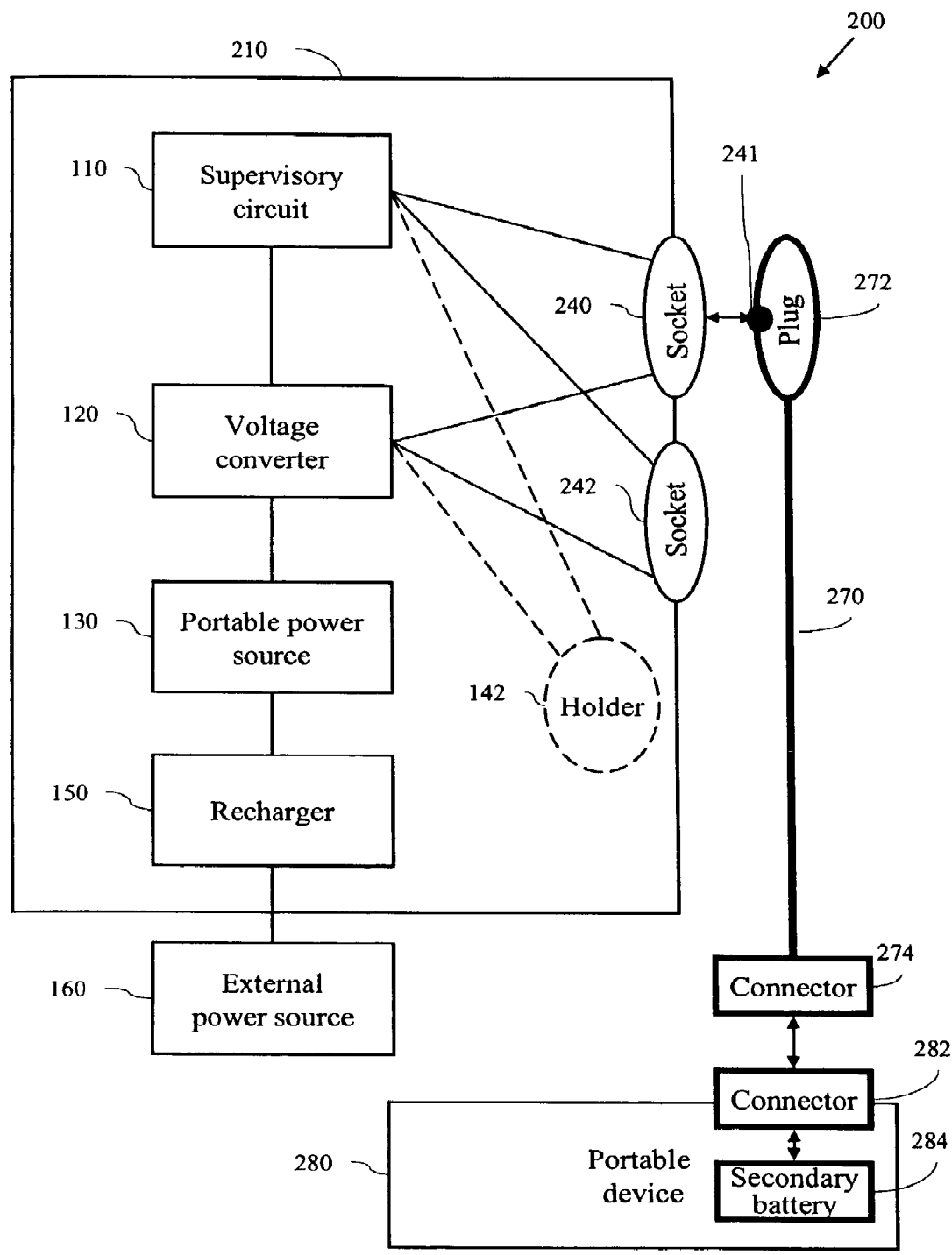
FIG. 2 is a schematic diagram illustrating another embodiment of the present invention comprising a battery charging system having a portable battery recharge station and a device-specific charging cord.

FIG. 2 is a schematic diagram illustrating another embodiment of the present invention comprising a battery charging system 200 having portable battery recharge station 210 and device-specific charging cord 270. Components of station 210 are similar to components of station 100 described above. In lieu of or in addition to holders 140 and 142, station 210 further comprises one or more sockets 240 and 242. Sockets 240 and 242 are preferably universal connector sockets.

Like holders 140 and 142, sockets 240 and 242 are connected to supervisory circuit 110 and voltage converter 120. Sockets 240 and 242 are adapted to receive or mate with plug 272 of cord 270. Plug 272 is preferably a universal connector plug that is connected to a first end of cord 270. Plug 272 comprises programming resistor 241 that identifies the type and the voltage requirement of secondary battery 284 of portable device 280. The second end of cord 270 comprises connector 274, which is adapted to mate with connector 282 of portable device 280. When plug 272 and connector 274 are in contact with socket 240 and connector 282, respectively, electric current can flow from voltage converter 120 to secondary battery 284 through cord 270.

Station 210 can have one, two or more sockets although two sockets are depicted in FIG. 2. Preferably, sockets 240 and 242 are identical. In other words, secondary battery 284 residing within portable device 280 can be recharged by station 210 regardless of whether plug 272 is mated with socket 240 or 242. Programming resistor 241 of plug 272 reports the voltage requirements of secondary battery 284 (that has been placed in portable device 280) to supervisory circuit 110.

Portable device 280 can be any electronic device that can be powered by secondary battery 284. For example, portable device 280 can be a wireless telephone, a camcorder, or a CD player. Secondary battery 284 can be one of NiCd, $NiH_2$, NiMH, Li-ion, Li-polymer, zinc-air, and other rechargeable batteries.

It is noted that each of sockets 240 and 242 can receive other plugs of different device-specific charging cords for a variety of portable devices.

Figure 3:
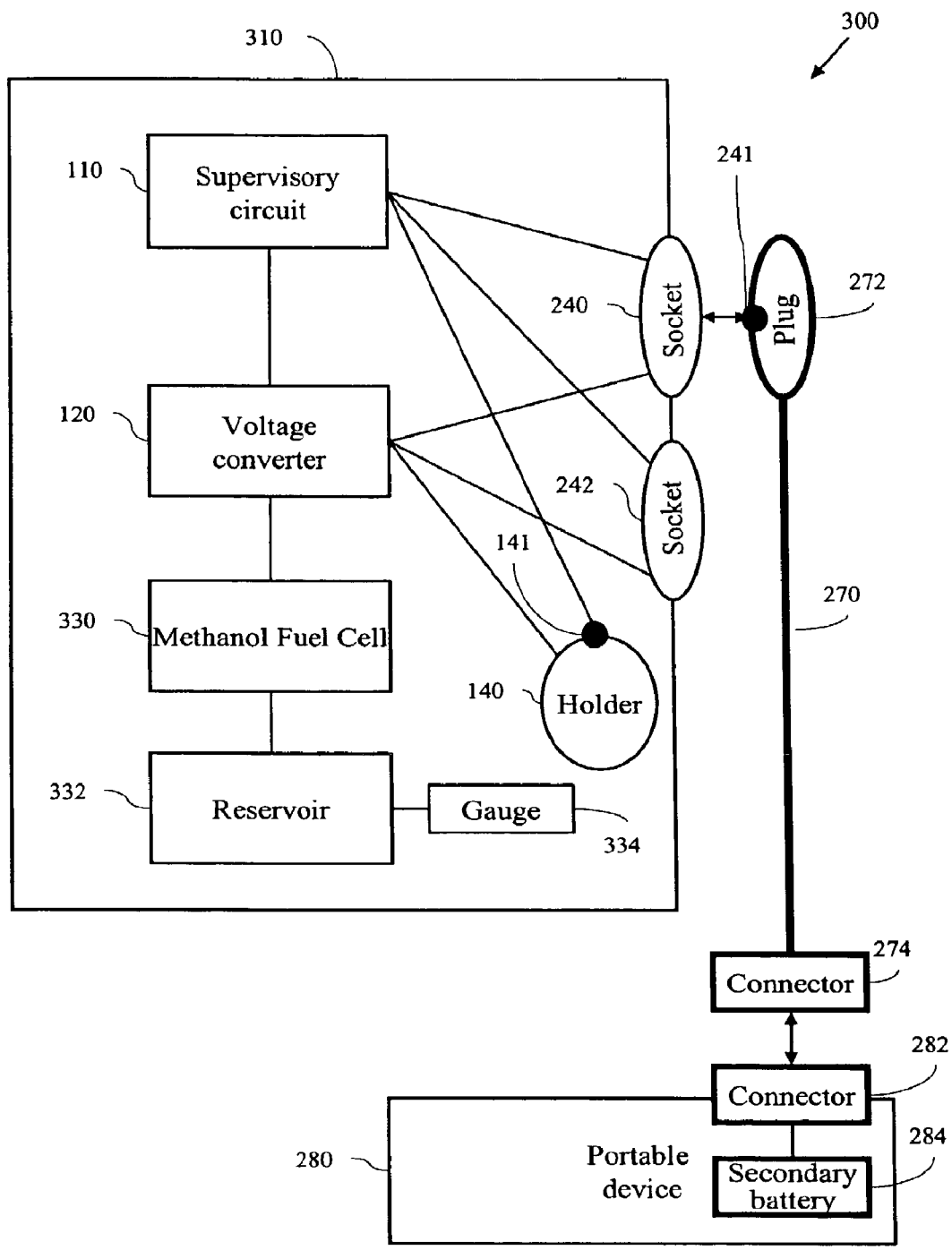
FIG. 3 is a schematic diagram illustrating another embodiment of the present invention comprising a renewable portable power source.

FIG. 3 is a schematic diagram illustrating another embodiment of the present invention comprising a renewable portable power source.

Station 310 of system 300 comprises supervisory circuit 110, voltage converter 120, methanol fuel cell 330, and reservoir 332. Station 310 also comprises one or more of holder 140 and sockets 240 and 242. Holder 140 is adapted to receive secondary battery 284 of portable device 280. Sockets 240 and 242 are adapted to mate with plug 272, which is part of cord 270 having plug 272 on one end and connector 274 on the other end. Connector 274 is adapted to mate with connector 282, which is connected to secondary battery 284 of portable device 280.

Methanol fuel cell 330 is connected to reservoir 332. Optionally, reservoir 332 has an optional gauge 334, to measure the amount of methanol remaining in reservoir 332.

Methanol fuel cell 330 converts chemical energy in methanol contained in reservoir 332 to electric energy. The electric energy is then used to recharge secondary battery 284. Secondary battery 284 can either be charged in or out of portable device 280. For example, secondary battery 284 can remain in portable device 280 and be charged through cord 270. Alternatively, secondary battery 284 can be taken out of portable device 280 and be placed in holder 140.

As the chemical energy is converted to the electric energy, the amount of methanol in reservoir 332 decreases. The level of methanol in reservoir 332 may be measured by optional gauge 334. For example, optional gauge 334 may comprise a clear, transparent window of reservoir 332. Through the transparent window, the level of methanol in reservoir 332 can be visually observed by a user. Alternatively, optional gauge 334 may be an electrical or mechanical means for providing an indication of the level of methanol in reservoir 332.

For example, gauge 334 may comprise one or more light emitting diodes (LEDs). Gauge 334 may emit a green light when reservoir 332 contains more than a threshold amount of methanol. When methanol in reservoir 332 drops below a predetermined level, gauge 334 may emit a red light, indicating that reservoir 332 must be refilled with methanol.

Figure 4:
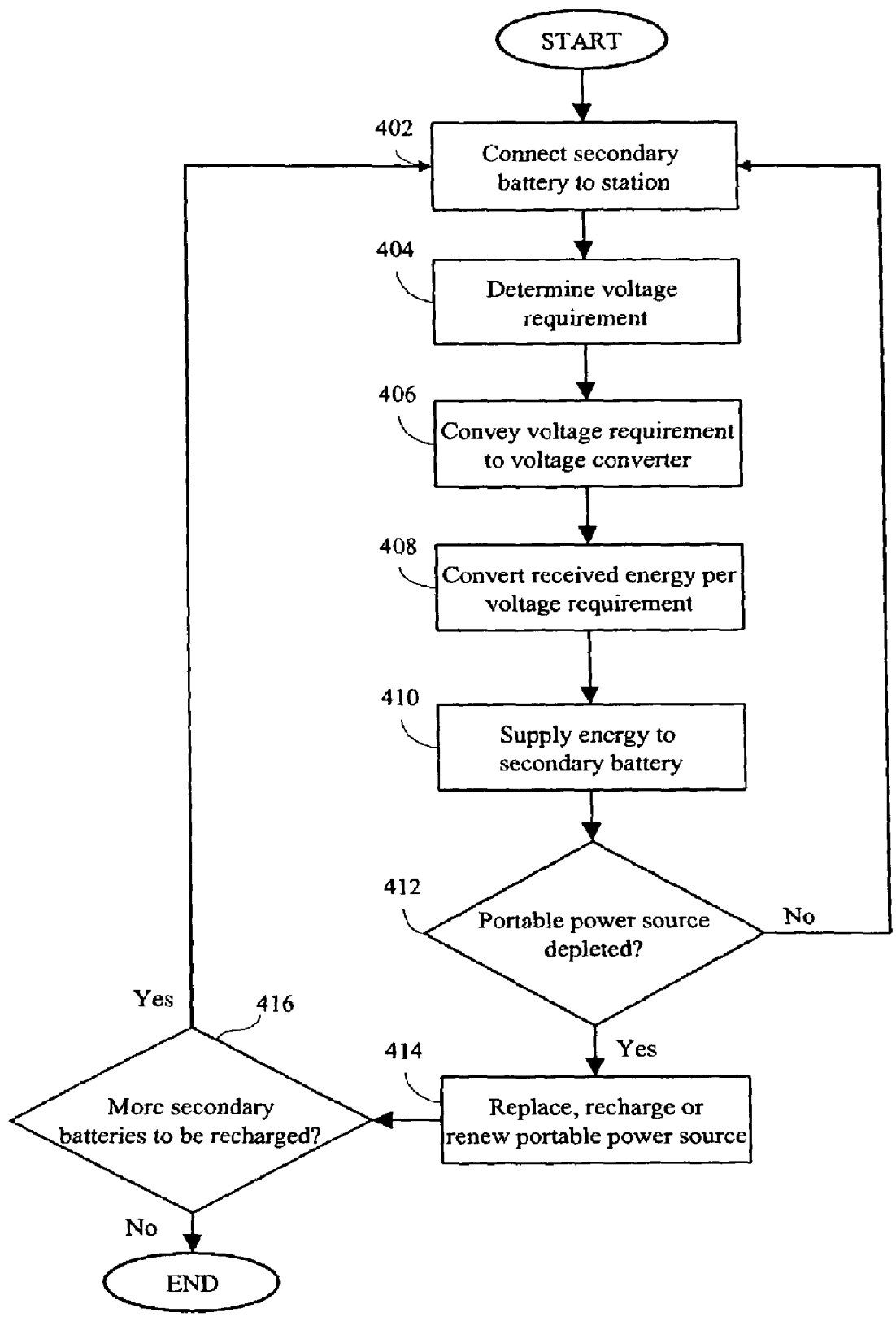
FIG. 4 is an exemplary flowchart illustrating the steps involved in using an embodiment of the present invention.

FIG. 4 is a flowchart illustrating the steps involved in using an embodiment of the present invention.

In step 402, a depleted secondary battery is connected to or placed in the portable battery recharge station of the present invention. As described above, connection of the secondary battery to the station can be made through a holder or a socket, depending on whether the secondary battery is removed from a portable device.

In step 404, the supervisory circuit measures the value (i.e., the resistance) of a programming resistor, and determines the voltage requirement for charging the secondary battery. The voltage requirement may be determined in any of several ways. For example, a look-up table may be used to associate each resistance of the programming resistor with a specific voltage requirement. Alternatively, a formula or equation may be used to calculate a voltage requirement for each resistance of the programming resistor. More advanced systems may also specify current limits (again, by associating the resistance of the programming resistor with a current limit in a look-up table, or by using equations or formulas).

In step 406, the supervisory circuit conveys the voltage requirement to a voltage converter of the station.

In step 408, the voltage converter receives electrical energy from a portable power source of the station and converts the received energy up or down in accordance with the voltage requirement.

In step 410, the converted energy is supplied to the secondary battery.

Steps 402 through 410 can be repeated many times. In other words, more than one secondary battery can be recharged by the portable battery recharge station as long as the portable power source has not depleted its energy in step 412.

In step 414, the portable power source can be replaced, recharged, or renewed depending on whether the portable power source is replaceable, rechargeable, or renewable.

In step 416, if more secondary batteries are to be recharged, the process returns to step 402.

In an alternative embodiment, the portable battery charger may be configured to supply alternating current (rather than direct current), at the appropriate voltage, to devices which are designed to be recharged with alternating current.

In another alternative embodiment, the portable battery recharge station includes circuitry that allows the portable battery recharge station to receive power from a wall outlet (e.g., a 110 or 240 volt outlet, or a car's cigarette lighter outlet), when such an outlet is available, as an optional alternative to using a primary battery as the replaceable power source.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

The foregoing disclosure of the preferred embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What we claim is:

1. A portable battery recharge station comprising:
a socket;
a connector having a first end configured to mate with a device having a secondary battery and a second end configured to mate with the socket;
a supervisory circuit that determines a voltage requirement of the secondary battery based on an attribute of the connector when the connector is connected to the socket; and
a voltage converter in communication with the supervisory circuit and connected to the socket, wherein the supervisory circuit instructs the voltage converter to supply a voltage to the socket in accordance with the voltage requirement;
and wherein the voltage converter receives power from a power source.

2. The station of claim 1 wherein the attribute of the connector is a resistance.

3. the station of claim 1, wherein the power source is an alternating current power source.

4. The station of claim 1, wherein the power source is a direct current power source.

5. The station of claim 1, wherein the power source is one of a replaceable battery, a rechargeable battery, a renewable battery, and a renewable fuel cell.

6. The station of claim 5 further comprising a reservoir adapted to contain fuel of the renewable battery and a gauge adapted to measure a level of the fuel.

7. A battery charging system comprising:
a charging connector having a first end that is configured to mate with a device having a secondary battery and having a second end;
a portable battery recharge station having a voltage converter and a supervisory circuit, the portable battery recharge station being configured to receive the second end of the charging connector, wherein when the charging connector is connected to the device and the portable battery recharge station, the supervisory circuit determines a voltage requirement of the secondary battery based on a resistance of the charging connector, and the supervisory circuit then instructs the voltage converter to supply a voltage to the secondary battery in accordance with the voltage requirement;
and wherein the voltage converter receives power from a power source.

8. The system of claim 7, wherein the power source is an alternating current power source.

9. The system of claim 7 wherein the power source is a direct current power source.

10. The system of claim 7 wherein the power source is one of a replaceable battery, a rechargeable battery, a renewable battery, and a renewable fuel cell.

11. The system of claim 10, wherein the replaceable battery is one of an alkaline battery, a lithium battery and a zinc-air battery.

12. The system of claim 10, wherein the rechargeable battery is one of a NiCd battery, a $NiH_2$ battery, a NiMH battery, a Li-ion battery, a Li-polymer battery, a zinc-air battery, and a lead acid battery.

13. The system of claim 12, further comprising a recharger connected to the portable power source, wherein the recharger is adapted to receive power from an external power source.

14. The system of claim 12, wherein the renewable battery is one of a methanol fuel cell and a renewable electrolyte type cell.

* * * * *